J. L. WILLOUGHBY.
Improvement in Harrow.

No. 118,570. Patented Aug. 29, 1871.

Witnesses:
John Becker
Francis McArdle

Inventor:
J. L. Willoughby
Per
Attorneys.

UNITED STATES PATENT OFFICE.

JOSEE L. WILLOUGHBY, OF BOWLING GREEN, KENTUCKY.

IMPROVEMENT IN HARROWS.

Specification forming part of Letters Patent No. 118,570, dated August 29, 1871.

*To all whom it may concern:*

Be it known that I, JOSEE L. WILLOUGHBY, of Bowling Green, in the county of Warren and State of Kentucky, have invented a new and useful Improvement in Harrows; and I do hereby declare that the following is a full, clear, and exact description thereof, which will enable others skilled in the art to make and use the same, reference being had to the accompanying drawing forming part of this specification, in which—

Figure 1:
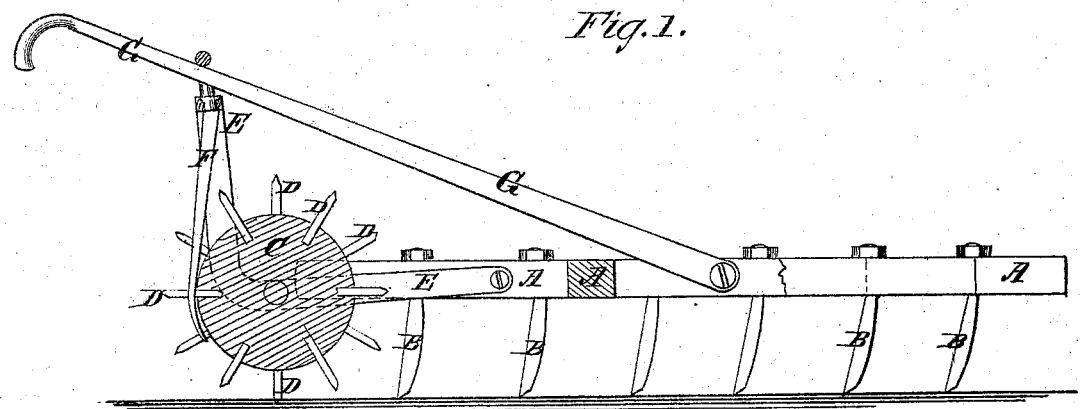
Figure 2:
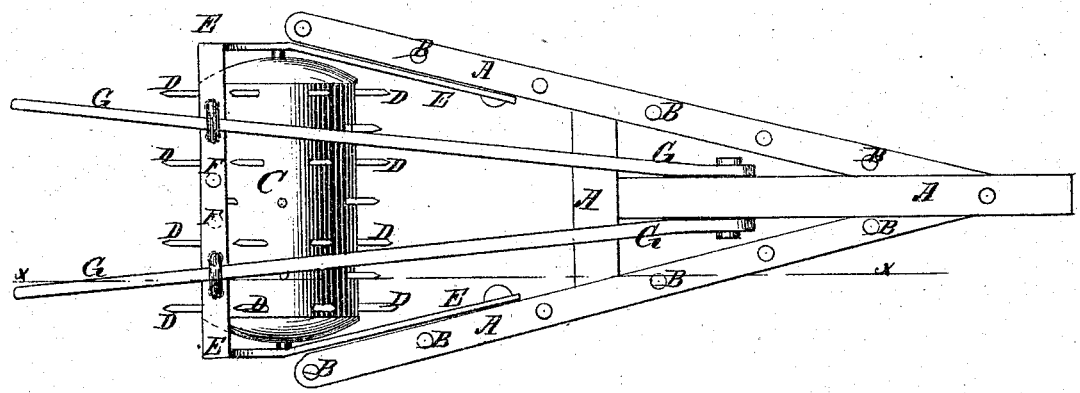

Figure 1 is a side view of my improved harrow, partly in section, through the line $xx$, Fig. 2. Fig. 2 is a top view of the same.

Similar letters of reference indicate corresponding parts.

My invention has for its object to improve the construction of the ordinary harrow so as to make it better adapted for pulverizing the ground, breaking up the clods, cutting and tearing in pieces the sods, and at the same time leaving the soil smooth, mellow, and light; and it consists in the construction and combination of certain parts of the harrow, as hereinafter more fully described.

A is the frame of an ordinary V-shaped harrow, which is made in the ordinary manner. B are the harrow-teeth, the upper ends or shanks of which pass up through the frame A and are secured by nuts. The lower or working parts of the teeth B are made with an edge upon their forward sides, the lower part of said edge being inclined to the rearward, so that the said teeth may slide over instead of catching upon the roots or other obstructions they may encounter. C is a roller, to the convex surface of which are attached teeth D, by which the ground, as it is rolled level by the roller, will be loosened and stirred up so as to be left mellow and light. The journals of the roller C revolve in bearings in the bars E, the ends of which are pivoted to the rear part of the side bars of the frame A. The bars E are bent upward at right angles, extend upward to a suitable height above the roller, and are bent inward at right angles so as to be above and parallel with the rear part of the said roller. To the upper or horizontal part of the bar E are attached teeth F, which project downward along the rear side of the roller C, so as to clean off any sods or dirt that may adhere to the surface of the roller C or to the teeth D attached to said roller. G are the handles, the forward ends of which are pivoted to the opposite sides of the central bar of the harrow-frame A. The handles G pass back through keepers attached at suitable distances apart to the upper or horizontal part of the bar E, as shown in Figs. 1 and 2. By this construction the toothed roller C D can rise to pass over obstructions without interfering with the operation of the harrow A B, and by bearing down upon the handles G the harrow A B can be raised from the ground for convenience in turning and for avoiding stumps and other obstructions.

Having thus described my invention, I claim as new and desire to secure by Letters Patent—

The combination of the harrow A B, toothed roller C D, pivoted bar E, teeth F, and pivoted handles G with each other, substantially in the manner herein shown and described, and for the purpose set forth.

JOSEE L. WILLOUGHBY.

Witnesses:
 JAS. H. WILKINS,
 JAS. C. KELLEY.